United States Patent
Thorley et al.

(10) Patent No.: US 8,219,985 B2
(45) Date of Patent: *Jul. 10, 2012

(54) METHOD AND SYSTEM FOR VERSION INDEPENDENT SOFTWARE RELEASE MANAGEMENT

(75) Inventors: Jeb Stuart Thorley, Kingston (CA); Justin Alexander Foster, Kanata (CA)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,210

(22) Filed: Dec. 13, 2011

(65) Prior Publication Data

US 2012/0084764 A1    Apr. 5, 2012

Related U.S. Application Data

(63) Continuation of application No. 12/170,931, filed on Jul. 10, 2008, now Pat. No. 8,117,596.

(60) Provisional application No. 60/949,185, filed on Jul. 11, 2007.

(51) Int. Cl.
    *G06F 9/44* (2006.01)

(52) U.S. Cl. ..................................... 717/170

(58) Field of Classification Search .............. 717/120, 717/122, 124, 168–170
    See application file for complete search history.

(56) References Cited

U.S. PATENT DOCUMENTS

| | | | |
|---|---|---|---|
| 4,558,413 A | 12/1985 | Schmidt | |
| 5,155,847 A | 10/1992 | Kirouac | |
| 5,278,979 A * | 1/1994 | Foster et al. | 1/1 |
| 5,291,598 A | 3/1994 | Grundy | |
| 5,649,200 A * | 7/1997 | Leblang et al. | 717/122 |
| 5,903,897 A | 5/1999 | Carrier | |
| 5,950,209 A | 9/1999 | Carrier | |
| 7,272,815 B1 * | 9/2007 | Eldridge et al. | 717/101 |
| 7,805,420 B2 * | 9/2010 | Kapoor et al. | 707/695 |
| 7,870,550 B1 * | 1/2011 | Qureshi et al. | 717/174 |
| 7,913,227 B2 * | 3/2011 | Aikens et al. | 717/120 |
| 8,117,596 B2 * | 2/2012 | Thorley et al. | 717/122 |
| 2006/0174240 A1 * | 8/2006 | Flynn | 717/170 |
| 2007/0094312 A1 * | 4/2007 | Sim-Tang | 707/204 |
| 2009/0125128 A1 * | 5/2009 | Eldridge et al. | 700/86 |

OTHER PUBLICATIONS

RCS—A System for Version Control, Tichy et al., Software—Practice & Experience 15, 7 (Jul. 1985), 637-654.*
Essential CVS (a book) O'Reilly Media, Inc. ©2006 ISBN 978-0-596-52703-7.*
Subversion Version Control: Using the Subversion Version Control System in Development Projects (a book) • Prentice Hall 2005, ISBN:978-0-13-185518-2.*

* cited by examiner

*Primary Examiner* — Don Wong
*Assistant Examiner* — Daxin Wu
(74) *Attorney, Agent, or Firm* — IP-MEX Inc.; Victoria Donnelly

(57) ABSTRACT

A system for assembling an update for a software release is described, comprising a processor and memory configured to define classes of software components, each class having a plurality of instances, each instance having a unique identifier (UID) and representing a software component having a plurality of versions; for each version of the software component, assign time stamps and indicator identifying release status of the version; introduce a flexible coupling between versions of software components and instances of classes using a pointer between a version of the software component and a UID associated with the version; select versions of software components from which pointers originate; for each instance of the class, to which the pointer points, select one version of the software component based on the assigned indicator; and assemble the selected versions of software components into the update of the software release. A corresponding method is also provided.

20 Claims, 15 Drawing Sheets

METHOD AND SYSTEM FOR VERSION INDEPENDENT SOFTWARE RELEASE MANAGEMENT

RELATED APPLICATIONS

The present application is a Continuation of U.S. application Ser. No. 12/170,931 to Jeb Thorley filed on Jul. 10, 2008 for now U.S. Pat. No. 8,117,596 "Method and System for Version Independent Software Release management", which claims benefit from the U.S. provisional application Ser. No. 60/949,185 to Jeb Thorley, filed on Jul. 11, 2007 entitled "Version Independent Software Release Management", entire contents of both applications being incorporated herein by reference.

FIELD OF THE INVENTION

The present invention relates to software release management, and in particular, to version independent component release management.

BACKGROUND OF THE INVENTION

Software release management is a new and rapidly growing area of software engineering.

As software systems, software development processes and resources become more distributed and specialized, they invariably become more complex. Additionally, software products may be run on various platforms, and they are typically involved in various cycles of software development, testing and release.

As a result, there are many software modules that are at various stages of the development and testing, which have to operate seamlessly together to ensure the value of a software product to a customer.

Therefore the need exists for the development of a flexible software release management, which would be simpler and more expedient than the existing solutions.

BRIEF DESCRIPTION OF THE DRAWINGS

The embodiments of the invention will now be described, by way of example, with reference to the accompanying drawings in which.

SUMMARY OF THE INVENTION

Figure 1:
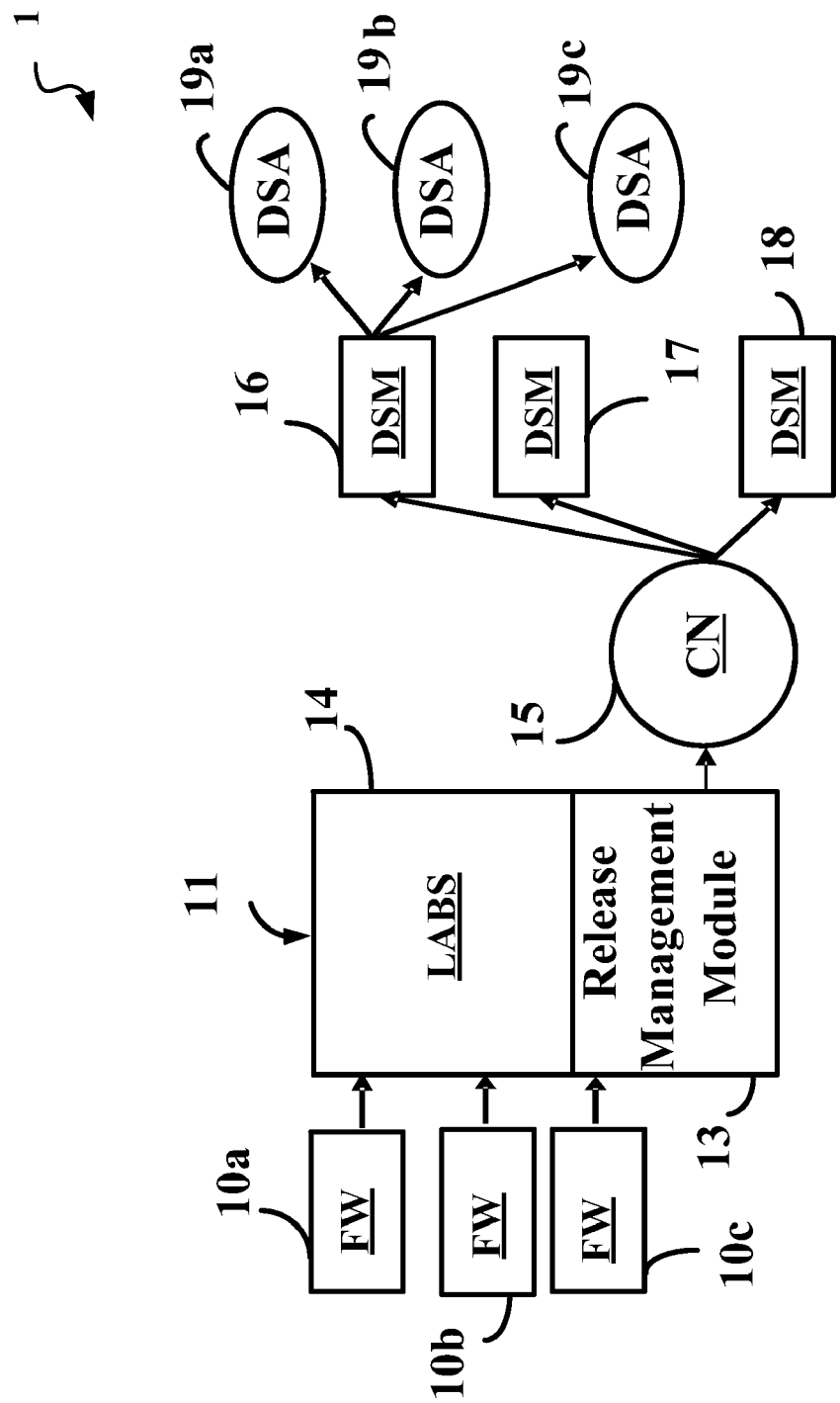
FIG. 1 illustrates a host intrusion prevention system (HIP), in which embodiments of the invention have been implemented.

There is an object of the invention to provide a method and system for assembling an update for a software release, which would avoid or mitigate drawbacks of the prior art.

According to one aspect of the invention, there is provided a method for assembling an update for a software release, comprising steps of:

(a) defining classes of software components, each class comprising one or more instances of the class, each instance having a unique identifier (UID), each instance of the class representing a software component, which has one or more versions;

(b) for each version of a software component, assigning one or more time stamps, and an indicator identifying a status of the version of the software component;

(c) introducing a flexible coupling between versions of components and instances of classes by providing a pointer between a version of a component and a UID of an instance of a class;

(d) selecting versions of software components from which pointers originate;

(e) for each instance of the class, to which the pointer points at, selecting one version of the software component based on the assigned indicators;

(f) assembling the selected versions of software components into the update of the software release.

The step (b) comprises assigning one or more of the following indicators:

(l) a deleted indicator when a version of software component is no longer needed;

(m) an issued indicator when a version of software component is included in a current software release; or (n) an un-issued indicator when a new version of the software component has been submitted to repository of software components, or when the version of software component does not have the issued or deleted indicator.

The step (b) further comprises:

(p) assigning a checked-in date set and an issued date set to each version of the software components.

The step (p) comprises assigning the checked-in date set, including a checked-in date time stamp when the version of the software component has become the latest version of the software component, and a checked-in retired date time stamp when a new version of the software component is submitted to repository of software components.

The step (p) further comprises assigning the issued date set including an issued date time stamp when the version of software component is assigned the issued indicator, and an issued retired date time stamp when the version of software component is assigned the un-issued or deleted indicator.

In the method described above, the steps (d) and (e) comprise selecting versions of software components, which have the issued indicator to form an issued view of the software components.

The steps (d) and (e) further comprise selecting versions of software components having the most recent checked-in date time stamps and no checked-in retired date time stamps to form a latest view of the software components.

In the embodiment of the invention, the step (a) comprises defining one or more of the following classes:
(i) an Application Type class;
(ii) a Filter class;
(iii) a Port List class.

According to the rules for the assembly of the update for software release, the method further comprises a step (y1) preventing the version of the software component, from which the pointer originates, to be set as the issued version of the software component unless at least one version of a software component in the instance of the class, to which the pointer points at, has the issued indicator, the step (y1) being performed before the step (f).

The method further comprises a step (y2) preventing the version of the software component, to which the pointer points, to have a deleted indicator applied as long as the version of the software component is pointed to by a pointer originating from a version of another software component, which has an issued indicator, the step (y2) being performed before the step (f).

The method further comprises a step (y3) preventing the version of the software component to have un-issued indicator once the version of software component is included in the update of the software release.

In the method described above, the step (c) comprises providing the pointer between the version of the software component in the Filter class and the UID of the instance of the Application Type class.

The step (b) further comprises:
(z1) provided the version of software component has a valid name, determining whether the version of software component does not have a deleted indicator;
(z2) performing validation for the version of software component based on the class;
(z3) if there is no a previous version of software component, assigning a checked-in date time stamp to the version of software component; otherwise,
(z4) if there is a previous version of software component, setting a checked-in retired time stamp to the previous version of software component;
z5) otherwise terminating the step (q).

The step (z2) further comprises:
checking-in the version of the Filter component from which the pointer originates, comprising:
ensuring that an Application Type component, to which the pointer points at, exists; and
provided there is a pointer to another Filter component, ensuring that said another Filter component exists.

The step (b) further comprises:
(s) assigning the issued indicator to the version of software component, comprising:
(s1) performing validation of the version of software component based on the class;
(s2) if the version of software component has a deleted indicator, assigning an un-issued indicator to the version of software component;
(s2) if the version of software component does not have a deleted indicator; determining that the version of software component does not have any version with the issued indicator, followed by assigning the issued indicator to the version of software component and setting an issued retired date time stamp to a previous version of software component.

The step (s1) further comprises:
(t) assigning the issued indicator to the version of the Filter component from which the pointer originates, comprising:
ensuring that an Application Type component, to which the pointer points at, exists and has an issued indicator; and
provided there is a pointer to another Filter component, ensuring that said another Filter component exists and has an issued indicator;
otherwise, terminating the step (t).

The step (b) further comprises:
(u) un-issuing the version of software component, comprising assigning the un-issued indicator, comprising:
(u1) performing validation of the version of software component based on the class;
(u2) determining whether the version of software component was not previously included in the update of software release and then deleted from the update;
(u3) if the version of software component has a deleted indicator, assigning an un-issued indicator to the version of software component;
(u4) if the version of software component does not have a deleted indicator, assigning an issued indicator to the version of software component, and assigning an issued retired date time stamp to the previous version of software component;
(u4) otherwise, terminating step (u).

The step (u) further comprises:
(v) un-issuing a version of Port List component, including assigning the un-issued indicator, comprising:
searching for versions of Application Type software components in the Latest view or the Issued view, which point to the version of the Port List component; and
terminating the step (v) if the Applicant Type software components, which point to the Port List software component, have issued indicators.

Yet further, the step (b) comprises:
(w) assigning the deleted indicator to the version of software component, comprising:
(w1) performing validation of the version of software component based on the class;
(w2) provided the version of software component has not been withdrawn from a repository of software components for further development:
(ww2) if the version of software component has an issued indicator, assigning an un-issued indicator and an issued retired time stamp to the previous version of the software component;
(www2) if the version of software component does not have an issued indicator, assigning the deleted indicator to the version of software component and setting its checked-in retired date stamp to the current date.

The step (w1) further comprises:
(x) assigning the deleted indicator to the version of the Port List component, comprising ensuring that no version of the Application Type component in the Latest view or the Issued view points at the instance of the Port List class.

According to another aspect of the invention, there is provided a system for assembling an update for software release, comprising:
(a) a repository of classes of software components, each class comprising one or more instances of the class, each instance having a unique identifier (UID), each instance of the class representing a software component, which has one or more versions;

(b) a software release management module, comprising:
- (b1) a rule repository, comprising rules for flexible coupling between versions of software components and instances of classes by providing a pointer between a version of a software component and a UID of an instance of a class;
- (b2) means for assigning, for each software component, one or more time stamps and indicators identifying status of the software component in accordance with the rules;
- (b3) means for selecting versions of software components from which the pointers originate; and for selecting, for each instance of the class, to which the pointer points at, one version of the software component based on the assigned indicators; and (c) means for assembling the selected versions of the software components into the update of the software release.

In the system described above, the indicators comprise one or more of the following:
(l) a deleted indicator when a version of software component is no longer needed;
(m) an issued indicator when a version of software component is included in a current software release; and
(n) an un-issued indicator when a new version of the software component has been submitted to repository of software components, or when the version of software component does not have the issued or deleted indicator.

The means (b2) comprises means for assigning date sets, comprising a checked-in date set and an issued date set, to each version of the software components;
wherein the checked-in date set includes a checked-in date time stamp when the version of the software component has become the latest version of the software component, and a checked-in retired date time stamp when a new version of the software component is submitted to repository of software components; and
wherein the issued date set includes an issued date time stamp when the version of software component is assigned the issued indicator, and an issued retired sate time stamp when the version of software component is assigned the un-issued or deleted indicator.

The means (b3) comprises means for generating views of versions of software components, including generating an issued view by selecting versions of software components, which have the issued indicator, and a latest view by selecting version of components, which have the most recent checked-in date time stamp.

The repository of classes (a) comprises one or more of the following classes:
(i) an Application Type class;
(ii) a Filter class;
(iii) a Port List class.

A computer readable medium is also provided, comprising computer readable instructions stored thereon, for execution by a processor, to perform the steps of the method described above.

Thus, an improved method and system for assembling an update for software release have been provided.

DESCRIPTION OF THE DETAILED EMBODIMENTS OF THE INVENTION

An embodiment of the present invention will be described with regard to software release management for security software, in particular, for host intrusion prevention/detection software developed by the applicants.

With reference to FIG. 1, a host intrusion prevention system (HIPS) 1 of the applicant, including a Release Management System 13 of the embodiments of the present invention, is illustrated.

The HIPS 1 comprises a server computer 11, including "Labs" module 14 for storing intrusion prevention system (IPS) filters; and a Release Management System 13 for implementing the embodiments for the software release management of the present invention. Both Labs 14 and Release Management System are stored in the memory of the server computer 11. IPS filters are defined in the "Labs" 14 through Filter Writer modules FW 10a, 10b and 10c, which are optionally stored in the memory of the server computer 11, or in a memory of one or more other computers.

The HIPS 1 further comprises a "Deep Security Agent" (DSA) 19, which includes a software module stored in the memory of a client computer and executed on the client computer, which performs the HIPS on the client computer. By way of example, three DSAs 19a, 19b and 19c are shown in FIG. 1.

The HIPS also comprises a "Deep Security Manager" (DSM) 16, which includes a software module including a server portion that is stored in the memory of a computer, and executed by the computer within the client's enterprise to communicate to the Labs 14 to receive updates, make queries to the DSAs 19a, 19b, 19c, and distribute security configuration to the DSAs 19a, 19b, 19c.

The server computer 11, including the Release Management System communicates with the Deep Security Managers 16, 17, 18 through a Communication Network (CN) 15.

To proceed with the description of the methods for assembling an update for a software release of the embodiment of the invention, a classification of software components will be presented next along with time stamps and indicators identifying status of software components.

According to the embodiment of the invention, software components are divided into classes, each class comprising one or more instances of the class, each instance of the class having a unique identifier (UID) and representing a software component, which may have an unlimited number of versions of the software component. Functionality of the software component can be modified in future versions of the software component.

Figure 2:
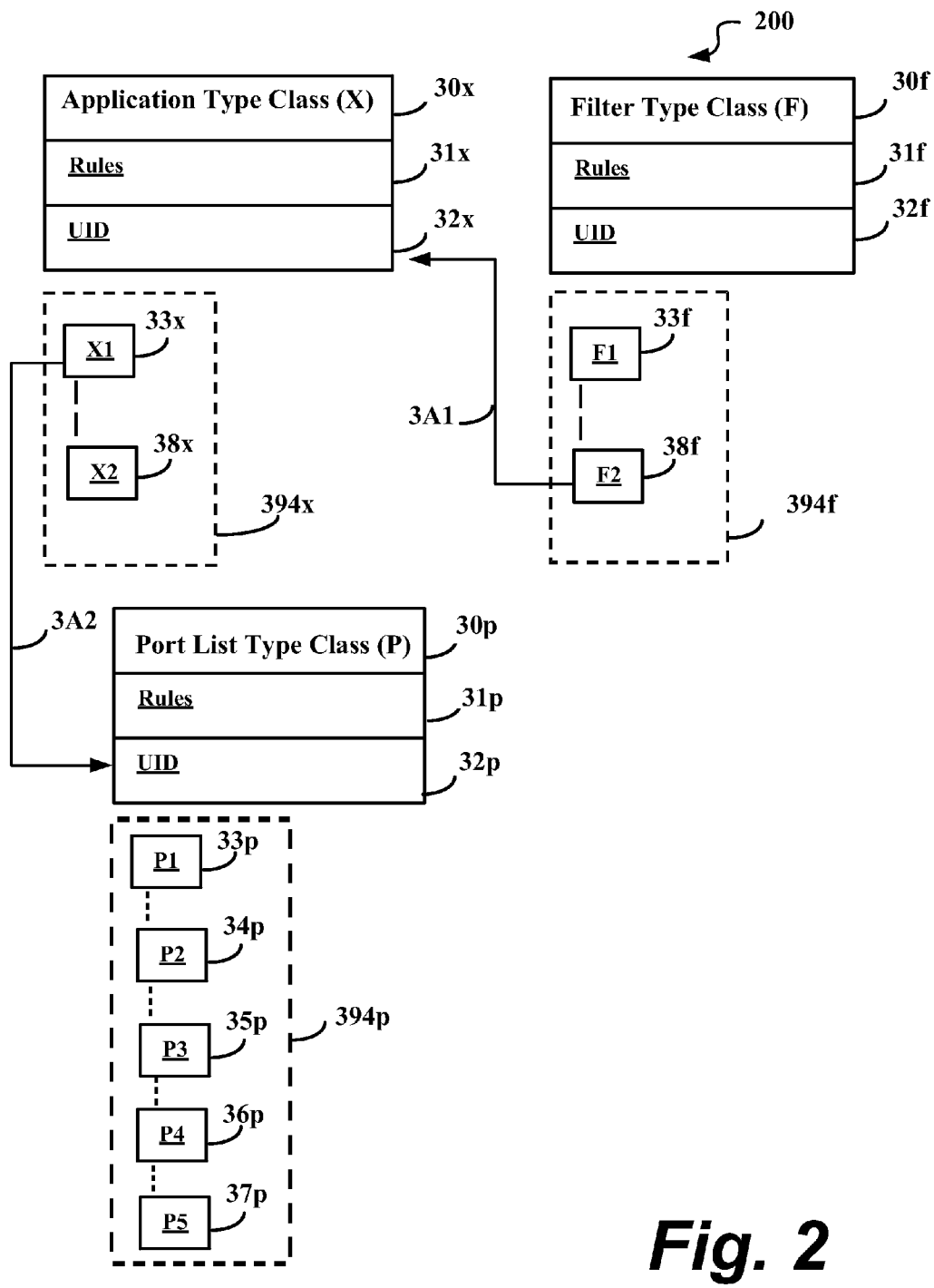
FIG. 2 illustrates classes of software components.

With reference to FIG. 2, diagram 200 illustrates three classes of software components, comprising: Application Type class (X) 30x representing a software component X, Filter class (F) 30f, representing a software component F, and Port List class (P) 30p representing a software component P.

Filter software components, or Filters, provide protection against network based attacks. They examine traffic to determine whether it contains malicious content, such as a known attack, or an amount of suspicious activity above an acceptable threshold, and take protective action. Each Filter should point to exactly one Application Type class, and may point to N other Filters via respective UIDs.

Application Type components represent a specific application, or class of software applications protected by IPS, for example an Internet Explorer (IE), or a Web Client. Application Types are used primarily to group Filters, but also may provide assistance in decoding the traffic generated by the application for further investigation by the Filters. Each Application Type must point to 1 Port List and may point to N other Application Types.

Port List software components specify a set of ports. They provide a means for Application Type software components to know what port(s) to listen to.

Each class of software components has rules defining how versions of software components and instances of each class interact with instances of other classes of software components, and in particular, defining rules for flexible coupling between versions of components and instances of classes. In FIG. 2, rules for Application Type class (X) 30x, Filter class (F) 30f and Port List class (P) 30p have been designated by reference numerals 31x, 31f and 31p respectively.

Each instance of the class of software components has a unique identifier (UID). Corresponding UIDs for Application Type class (X) 30x, Filter class (F) 30f and Port List class (P) 30p have been designated by reference numerals 32x, 32f and 32p in FIG. 2.

Each instance of a class, representing a software component, has a number of versions of the software component, for example, an instance 394x of the Application Type class (X) 30x has versions X1 (Version1) and X2 (Version2) of the software component X, designated by reference numerals 33x and 38x respectively. Similarly, an instance 394f of the Filter Class (F) 30f has versions F1 (Version1) and F2 (Version2) of the software component F, which have been labeled as 33f and 38f respectively, and an instance 394p of the class Port List (P) 30p has versions P1 (Version1), P2 (Version2), P3 (version4), P4 (Version4) and P5 (Version5) of the software component P, which have been labeled as 33p to 37p respectively. For simplicity, FIG. 2 illustrates only one instance per each class of software components 30x, 30f and 30p. It is understood that each class of software components may have many instances as required.

All versions of a software component represented by a given instance of the class have the same UID, which is the UID of the instance of the class. For example, version1 X1 (33x) and Version2 X2 (38x) of the instance of the class 394x, representing the software component X, have the same UID 32x, version1 F1 (33f) and version2 F2 (38f) of the instance of the class 394f, representing the software component F, have the same UID 32f, and all versions1 P1 to version5 P5 (33p) through (37p) of the instance of the class 394p, representing the software component P, have the same UID 32p.

As mentioned above, each class 30x, 30f and 30p of software components has respective rules 31x, 31f and 31p, which it follows. One rule in this regard introduces a flexible coupling between versions of components and instances of classes by providing a pointer between a version of a component and a UID of an instance of a class, for example, a pointer 3A1 between the version Fn (38f) of the software component F and the UID 32x of the instance of the Application Type class 30x, or a pointer 3A2 between the version X1 (33x) of the software component X and the UID 32p of the instance of the Port List class 30p as shown in FIG. 2. The flexible coupling is maintained by letting each version of the component store only the ID of an instance of a class to which it points, but not the version of the component that is requires. For example, version1 X1 (33x) of the component X of the instance of the class 394x may require that a component "P" of the instance of the class 394p is present, but is not concerned what version of the software component "P" it is, i.e. any one of version 1 P1 (33p) to version5 P5 (37p).

Another rule is concerned with the dependency between classes of software components. Although typically each class of software components depends only on one other class of software components, it is possible for a class to depend on multiple other classes, or even on other components of its own class. In the embodiment of the present invention, one or more versions Version1 F1 (33f) and Version 2 F2 (38f) of the Filter Class 30f may optionally point at another instance (not shown in FIG. 2) of the Filter class 30f as required, however, they should always point at a required instance of the Application Type class (x) 30x, see, e.g., the pointer 3A1 in FIG. 2. Similarly, one or more versions of the software component X of the Application Type class 30x should point at an instance of the Port List class 30p as illustrated by the pointer 3A1 in FIG. 2.

Figure 3:
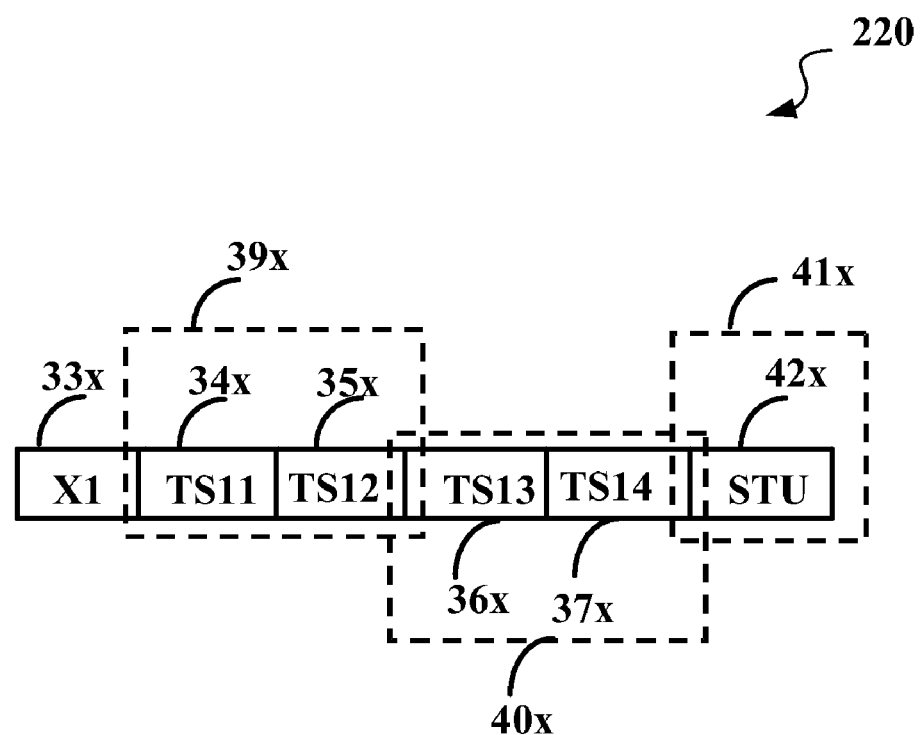
FIG. 3 illustrates status and timestamps associated with software components.

Each version of the software component has one or more time stamps associated therewith. By way of example, diagram 220 of FIG. 3 illustrates four time stamps TS11 (34x), TS12 (35x), TS13 (36x), and TS14 (37x), associated with the version1 X1 (33x) of the software component X. In the embodiment of the invention, the time sets are grouped into two date sets, namely a date set 39x, comprising time stamps 34x and 35x, and another date set 40x, comprising time stamps 36x and 37x.

The date set 39x assigned to the version1 X1 (33x) of the software component X and illustrated in FIG. 3, is a checked-in date set, including a checked-in date time stamp when the version of the component has become the latest version of the component, and a checked-in retired data time stamp when the next version of the software component is checked-in, i.e. submitted to a repository of software components.

The another date set 40x assigned to the version1 X1 (33x) of the software component X and illustrated in FIG. 3, is an issued date set, including an issued date time stamp when the version of the component is assigned the issued indicator, and an issued retired date time stamp when the version of software component is assigned the un-issued or deleted indicator.

Each version of the software component also has one or more indicators identifying status of the version of the software component. By way of example, an indicator STU (42x) has been shown for the version1 X1 of the software component X. In the embodiment of the invention, each version of the software component has a status indicator, or indicator, which is labeled as 41x in FIG. 3.

The following indicators have been used in the embodiment of the invention:
(l) a deleted indicator when a version of software component is no longer needed;
(m) an issued indicator when a version of software component is included in a current software release; or
(n) an un-issued indicator when a new version of the software component has been just checked-in, i.e. submitted to repository of software components, or when the version of software component does not have the issued or deleted indicator.

In order for a version of software component to be included in the update of software release, it should have an issued indicator.

Later, the version of the component having an issued indicator can have, if needed, an un-issued indicator, and vice versa.

All versions of a software component have deleted indicators when the software component is no longer needed, or alternatively, only the latest version may have a deleted indicator. Only one version of a software component can have an issued or deleted indicator at a given time.

When we delete a version of software component, it means that any attempt to retrieve it by the UID will indicate that it is deleted. To accomplish this, we perform the following:
1) Apply the deleted indicator to the latest version. Since only one version may have an issued/deleted indicator assigned, this means no version has an issued indicator assigned. Thus, the version of software component shows as deleted in the Issued view.

2) Set the checked-in retired date time stamp of the latest version of software component. Since the latest version of software component is defined as having the most recent checked-in date time, stamp with no check-in retired date time stamp, this will result in the version of software component showing as having a deleted indicator in the Latest view.

Figure 4:
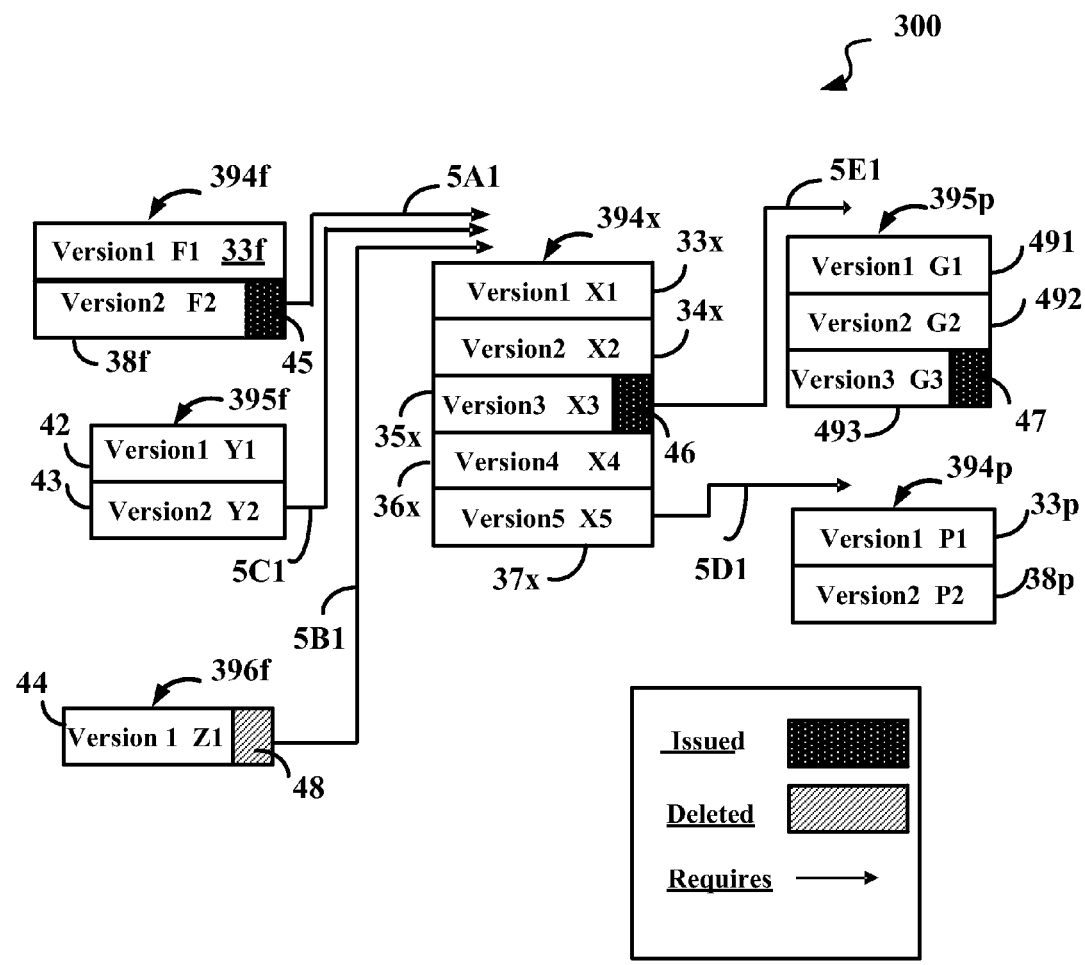
FIG. 4 illustrates a sample set of software components and their interrelationship.

Diagram 300 of FIG. 4 illustrates a sample set of software components and their relationships to be used in the assembly of an update for a software release. Three instances of the Filter Class 30f are shown, namely the instance of the class 394x including version1 F1 (33f) and version2 F2 (38f) of the software component F similar to that of FIG. 2, an instance of the class 395f including version1 Y1 (42) and version2 Y2 (43) of a software component Y, and an instance of the class 396f, including a version1 Z1 (44) of a software component Z. One instance of the Application Type class 30x is shown similar to that of FIG. 2, including five versions X1 to X5 (33x to 37x) of the software component X. Two instances of the Port List class 30p are shown, namely the instance of the class 394p including version1 P1 (33p) and version2 P2 (38p) of the software component P similar to that of FIG. 2, and the instance of the class 395p, including version1 G1 (491), version2 G2 (492) and version4 G3 (493) of a software component G.

The version2 F2 (38f) of the instance 394f of the Filter class 30f has an issued indicator 45, and the version2 F2 (38f) points at the UID (not shown in FIG. 4) of the instance 394x of the Application Type class 30x by pointer 5A1. The version1 Z1 (44) of the software component Z has a deleted indicator 48, and the version1 Z1 (44) which points at the UID (not shown in FIG. 4) of the instance 394x of the Application Type class 30x by pointer 5B1. The version2 Y2 (43) of the software component Y does not have any indicator associated with it, or may have an un-issued indicator assigned to it. The version2 Y2 (43) points at the UID (not shown in FIG. 4) of the instance 394x of the Application Type class 30x by pointer 5C1. The pointer 5A1 requires that the version of the Application Type component, to which it points, to be issued, i.e. assigned an issued indicator. The pointer 5C1 requires that the version of the Application Type component, to which it points, to be included in the Latest View, since version2 Y2 (43) is the latest version of the Filter component. The pointer 5A1 also requires that the version of the Application Type component, to which it points, to be included in the Latest View, since version2 F2 (38f) of the Filter component is included in both in the Issued view and the Latest view. Since the pointer 5B1 is for the version1 Z1 (44) of a Filter that is deleted, it has no requirements of the Application Type.

A pointer 5D1 from the version5 X5 (37x) of the software component X to the instance 394p of the Port List class 30p requires that any version of the software component from the instance 394p of the Port List class 30p is present.

Similarly, version3 X3 (35x) of the software component X has an issued indicator 46, and the version3 X3 (35x), which points at the UID (not shown in FIG. 4) of the instance 395p of the Port List 30p class by pointer 5E1, requiring that any version of the software component from the instance 395p of the Port List class 30p is present. Because version3 X3 (3x) of the Application Type 394x is issued, it requires that some version of the Port List 395p to which it points be present in the Issued View.

The result of publishing an update of the software release with the relationships detailed in FIG. 4 will be the update (394f.2, 394x.3, 395p.3), i.e. containing version2 F2 (38f) of the software component F of the instance 394f of the Filter class 30f, version3 X3 (35x) of the software component X of the instance 394x of the Application Type class 30x, and version3 G3 (493) of the software component G of the instance 395p of the Port List class 30p, as well as an instruction to delete the version1 Z1 (44) of the software component Z of the instance of the class 396f from the client installation. Please note that no versions of software components from the instance 395f of the Filter class 30f and instance 394p of the Port List class 30p will be included in the update of the software release, because they do not have issued indicators.

Some other rules for assembling the update of the software release include the following:

Version5 X5 (37x) of the instance 394x of the Application Type class 30x cannot be assigned an issued indicator until there is a version of the instance 394p of the Port List class 30p, which has an issued indicator;

Any version of the software component (491, 492 or 493) of the instance 395p of the Port List class 30p can not be assigned a deleted indicator as long as there is a pointer from the Version3 X3 (35x) of the instance 394x of the Application Type class 30x, or any other version 33x to 37x of the instance 39xp of the Application Type class 30x, to the instance 395p of the Port List class 30p;

The version2 F2 (38f) of the software component F of the instance 394f of the Filter class 30x cannot be assigned an un-issued indicator, because this version of the software component has been included in the update for the software release. This is required to avoid a violation of a requirement of a single predicable state after applying the update of the software release. If a subsequent update for a software release with unpublished version of the software component 33f having un-issued indicator were allowed, clients that had applied a previous update with the software component 33f having the issued indicator present would end in a different state than those that had not. However, if version2 F2 (38f) had never been included in an update for a software release, it can be assigned an un-issued indicator.

Any version1 X1 (33x) to version5 (37x) of the instance 394x of the Application Type class 30x cannot be assigned a deleted indicator, because it has pointers 5A1 and 5C1 from instances 394f and 395f of the Filter class 30f pointing at the instance 394x of the Application Type class 30x.

The rules for software release management outlined above are designed to ensure that clients obtain a single, predictable set of versions of software components after applying a given update. This implies further restrictions to operations that may be performed on a version of a software component after the version has been included in the update for the software release. For example, after a version of a software component has been included in the update for the software release, it should always appear in future updates to the software release, either having an issued indicator or deleted indicator. Other rules will be described below with regard to FIGS. 5-13.

Assembly of an Update for a Software Release

In addition to indicators identifying the status of versions of software components, there have been introduced two conceptual "views" of the version of components, a "Latest view" and an "Issued view". The Latest view comprises versions of software components having checked-in indicator, which have the most recent checked-in date time stamps to form a latest view of software components. The Latest view is a view of software components seen by software developers. Referring back to FIG. 4, one example of the Latest view of software components may comprise the following versions of software components: (394*f*.2, 395*f*.2, 396*f*.1, 394*x*.5, 395*p*.3 and 394*p*.2), i.e. it may include version2 F2 (38*f*) of the instance 394*f* of the Filter class 30*f*, version2 Y2 (43) of the instance 395*f* of the Filter class 30*f*, version1 Z1 (44) of the instance 396*f* of the Filter class 30*f*, version5 X5 (37*x*) of the instance 394*x* of the Application Type class 30*x*, version3 G3 (493) of the instance 395*p* of the Port List class 30*p*, and version2 P2 (38*p*) of the instance 394*p* of the port List class 30*p*.

The Issued view comprises a set of versions of software components, having an issued indicator; this is the view of the software components seen by clients. Referring back to FIG. 4, one example of the Issued view of software components will comprise the following versions of software components: (394*f*.2, 394*x*.3 and 395*p*.3), i.e. version 2 F2 (38*f*) of the instance 394*f* of the Filter class 30*f*, version3 X3 (35*x*) of the instance 394*x* of the Application Type class 30*x*, and version3 G3 (493) of the instance 395*p* of the Port List class 30*p*.

A version of a certain software component may have the latest checked-in date time stamp, and therefore will be included in the Latest view, but not yet included in an update for software release, because it has not been assigned an issued indicator. For any given time, the assembly and release of an update for software is invoked from the Issued view of software components, while continued development of the Latest view of software components is unaffected by the update of software release.

In order to obtain the Latest View or the Issued View of software components, a date-based approach using time stamps mentioned with regard to FIG. 3, has been used for managing versions of software components. Referring back to FIG. 3, the checked-in date set 39*x* comprises two time stamps, a checked-in date time stamp 34*x* and a checked-in retired date time stamp 35*x*. The checked-in date time stamp 34*x* is the date when the version1 X1 (33*x*) of software component X has been submitted to the repository of software components, hence becoming eligible for including in the Latest view of software components. The checked-in retired date time stamp when a new version of the software component is submitted to repository of software components. When a new check-in occurs for the new version of software component, the version of software component currently having the checked-in date time stamp will be assigned a check-in retired date time stamp.

Using the latest checked-in date time stamps enables a developer to retrieve the Latest view of software components for a given time period. It also allows them to determine the current latest version of software component by looking for the version of software component with no checked-in retired date time stamp.

When a version of a software component is assigned a deleted indicator, it is assigned a checked-in retired date time stamp, so that the version of software component will not appear in any Latest view.

As mentioned with reference to FIG. 3, the issued date set 40*x* comprises two time stamps, an issued date time stamp 36*x* and an issued retired date time stamp 37*x*. The issued date time stamp 36*x* is the date when a version of the software component is included in the update of software release. The retired date time stamp 37*x* is the date when the version of software component is assigned un-issued indicator, or when the version of software component is assigned a deleted indicator. The issued date time stamp 36*x* and the retired date time stamp 37*x* are used for managing the Issued view of software components, while the checked-in date time stamp 34*x* and checked-in retired date stamp 35*x* are used for managing the Latest view of software components. When a version of the software component is assigned an issued indicator, its issued date time stamp is set. When another version of the software component replaces the version of software component with the issued indicator, the issued retired date time stamp is set for the version of software component.

The rules for managing the issued date set are different from those for managing the checked-in date set, because the status of a given version of software component having an issued indicator may be changed multiple times. When such a change happens, a replacement does not have to be with a newer version. It is not uncommon for an update for software release, or a certain version of software component, to be rolled back to an earlier working update or version of software components respectively. In this case, the versions of software components in the rolled back update will be the ones having the issued indicator. Similarly, an issued version may be several versions higher than the previously issued version.

Figure 5:
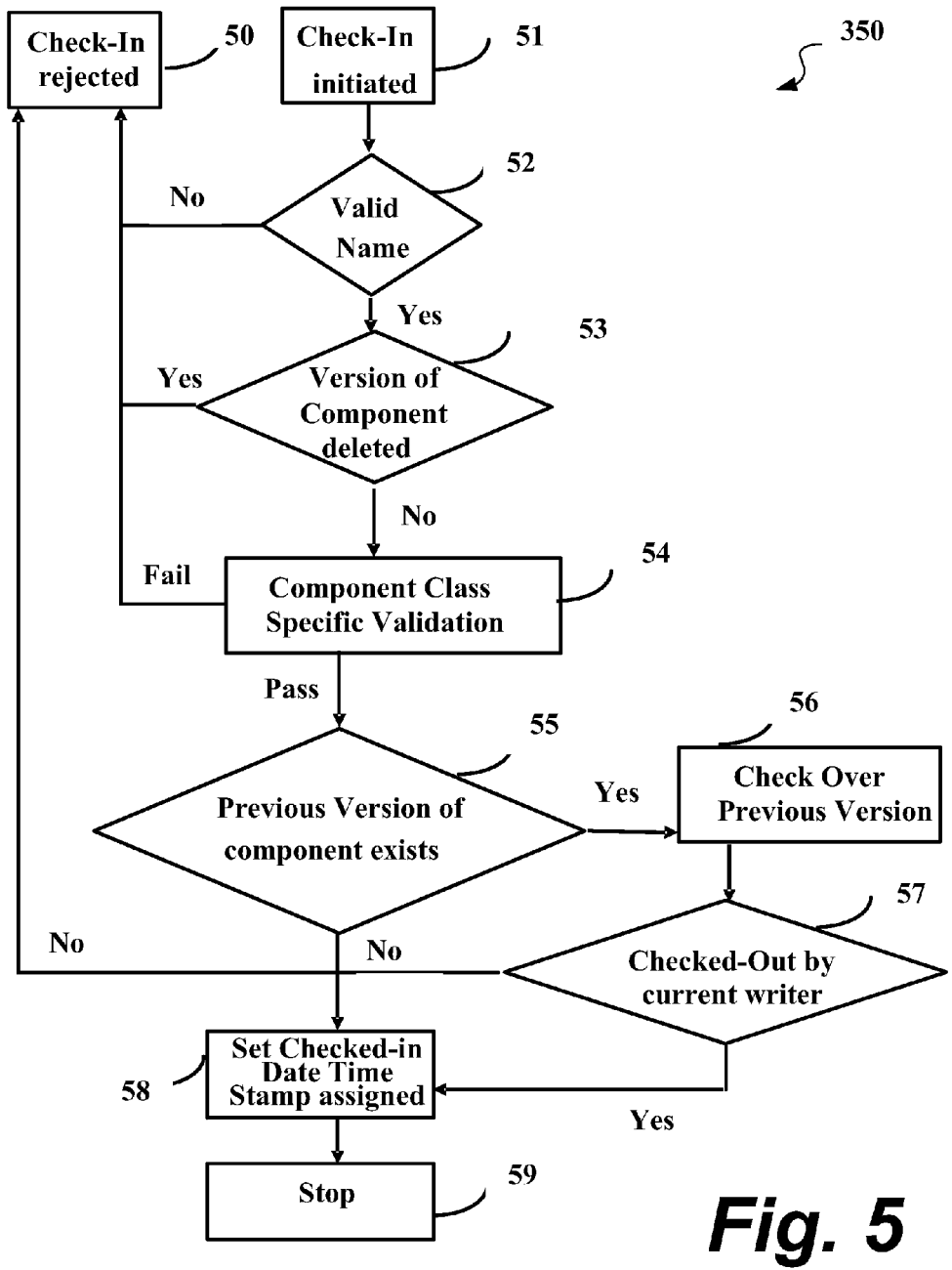
FIG. 5 shows a flow chart 300 illustrating a method for checking in a version of software component of any class and setting up its date time stamp.

With reference to FIG. 5, a method 350 for setting a checked-in date time stamp for a version of software component is described. The method 350 provides the framework used by all classes for checking in a version, and setting up its time stamp. Classes of components extend this framework with validation specific to their class. At block 51, the method is initiated. At block 52, name of the version of software component is examined. If it is invalid (exit "No" from block 52) the check-in is rejected (block 50), otherwise the method proceeds to block 53. At block 53, the method checks whether the version of software component was previously assigned a deleted indicator. If yes (exit "yes" from block 53), the check-in is rejected (block 50), otherwise the method proceeds to the next step to block 54. At block 54, the method checks that all dependencies are satisfied and have not been assigned a deleted indicator. Class specific validation is also performed to ensure the component meets the requirements to enter the repository. If the dependencies or validations are violated (exit "Fail" from block 54), the check-in fails (block 50), otherwise the method proceeds to the next step to block 55. At block 55, the existence of a previous version of software component is verified. If it does not exist (exit "No" from block 55), the method continues with setting the checked-in date time stamp, otherwise (exit "Yes" from block 55), the method continues with checking over the previous version of software component. At block 57, the method checks whether the current software developer has checked-out the previous version of software component, i.e. the previous version has been withdrawn from repository of software components for further development. If not (exit "No" from block 57), the check-in is rejected at block 50, otherwise the method continues with the next step (block 58). At block 58, check-in date time stamp is set for the version of software component, followed by termination of the method at block 59.

Figure 6:
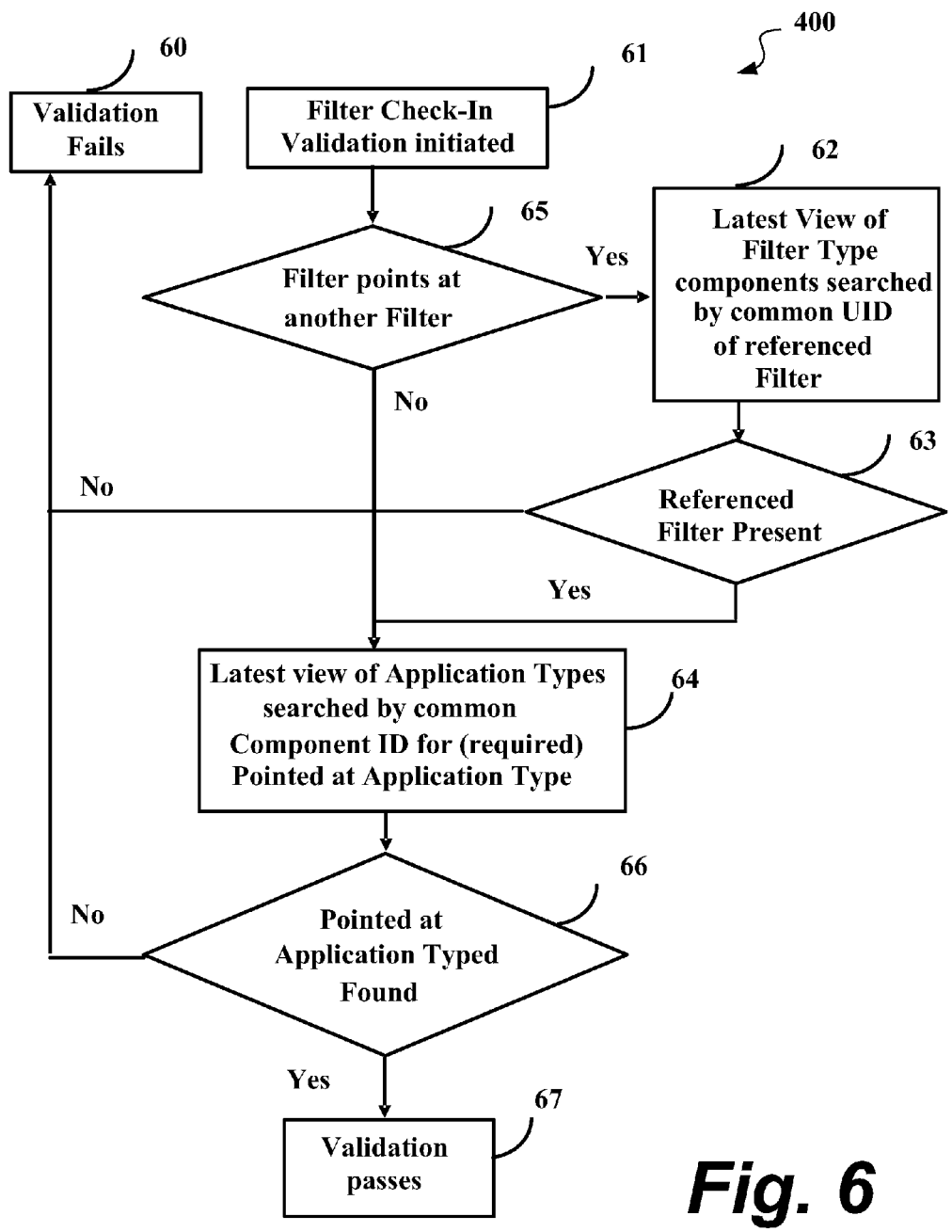
FIG. 6 shows a flowchart 400 illustrating a method for validating a checked-in version of a Filter software component.

With reference to FIG. 6, a diagram 400 illustrates a method for validating a checked-in version of Filter software component. At block 61, the method is initiated. At block 65, the method checks whether the version of Filter software component of a given instance of the Filter class 30*f* points at another instance of the Filter class 30*f*. If not (exit "No" from block 65), the method proceeds to the next step to block 64, otherwise (exit "Yes" from block 65) the method proceeds to block 62. At block 62, the Latest view including Filter software components is searched through the UID, which have pointers to the instance of a Filter class 30*f*. At block 63, the method determines if the instance of the Filter class to which the pointers point at, is present. If not (exit "No" from block 63), the validation fails (block 60), otherwise (exit "Yes" from block 63), the method continues with block 64. At block 64, the Latest View of Application Type software components is searched by common component ID to determine a pointer between the version of the component in the Filter class and the UID of the instance of the Application Type class. At block 66, the method checks whether the instance of the Application Type class, pointed at by the pointer, is present. If it is not (exit "No" from block 66), the validation fails (block 60); otherwise, the validation passes with block 67.

Figure 7:
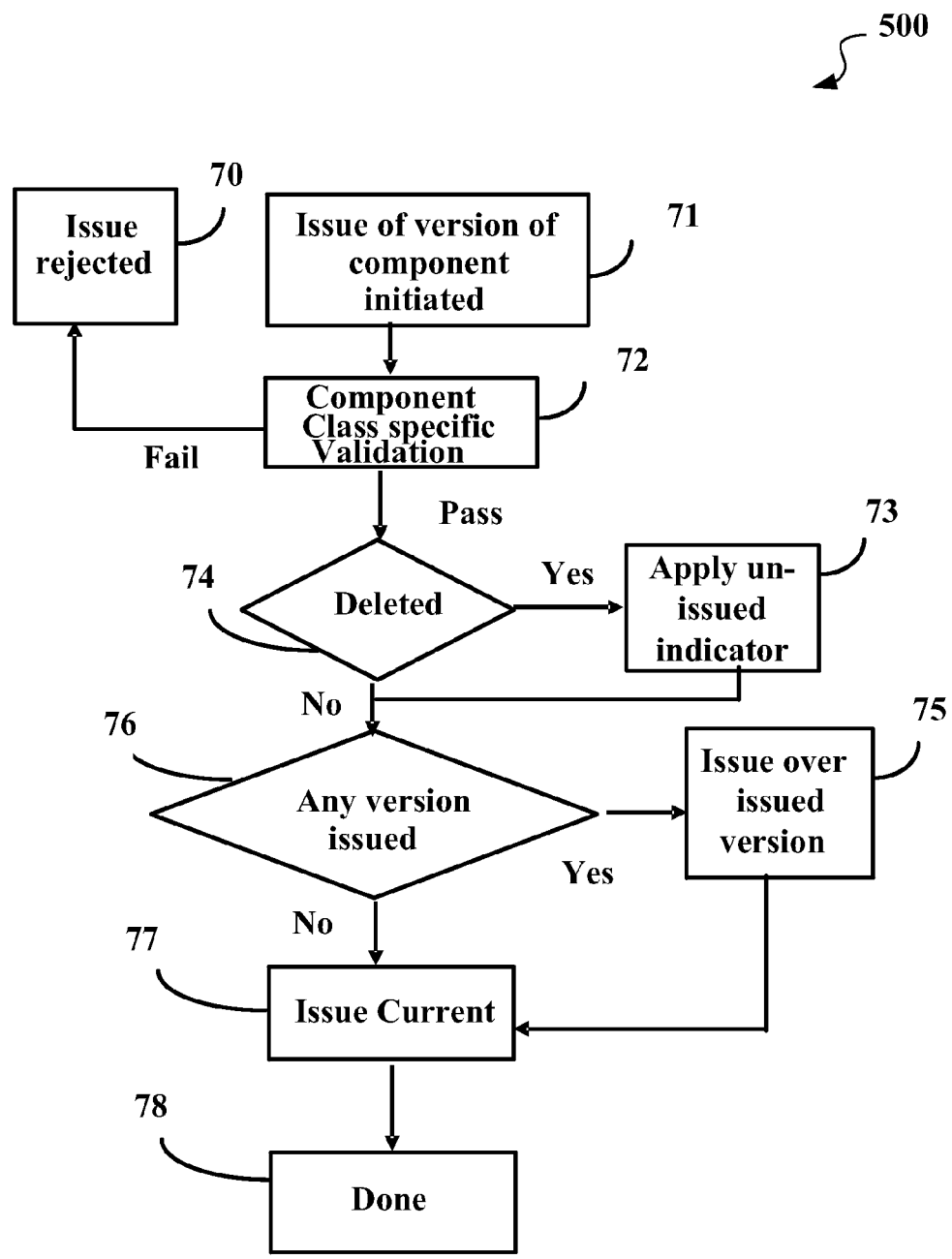
FIG. 7 shows a flowchart 500 illustrating a method for issuing a version of software component, comprising assigning an issued indicator and setting up an issue date.

With reference to FIG. 7, diagram 500 describes a method including rules, which are used for issuing a version of software component, including setting up an issue date and an issued indicator for a version of software component. At block 71, issue of a version of software component starts. At block 72, the method checks that all dependencies are satisfied and have not been assigned a deleted indicator. Class specific validation is also performed to ensure the component meets the requirements to be issued. If rules are violated (exit "Fail" from block 72), the issue is rejected (block 70), otherwise (exit "Pass" from block 72), the method continues to the next step to block 74. Block 74 verifies if the version of software component under examination was previously assigned a deleted indicator. If it was not (exit "No" from block 74), the method continues with block 76, otherwise (exit "Yes" from block 74), the method proceeds to block 73 where the deleted indicator is reset (un-deleted). At block 76, the method verifies whether any version of software component under examination was previously assigned an issued indicator. If not (exit "no" from block 76), the method continues with block 77, otherwise (exit "Yes" from block 76), it continues with block 75. At block 75, the version of the previously existing software component having the issued indicator is assigned an un-issued indicator. At block 77, the version of software component under examination is assigned an issued indicator, followed by termination of the method at block 78.

Figure 8:
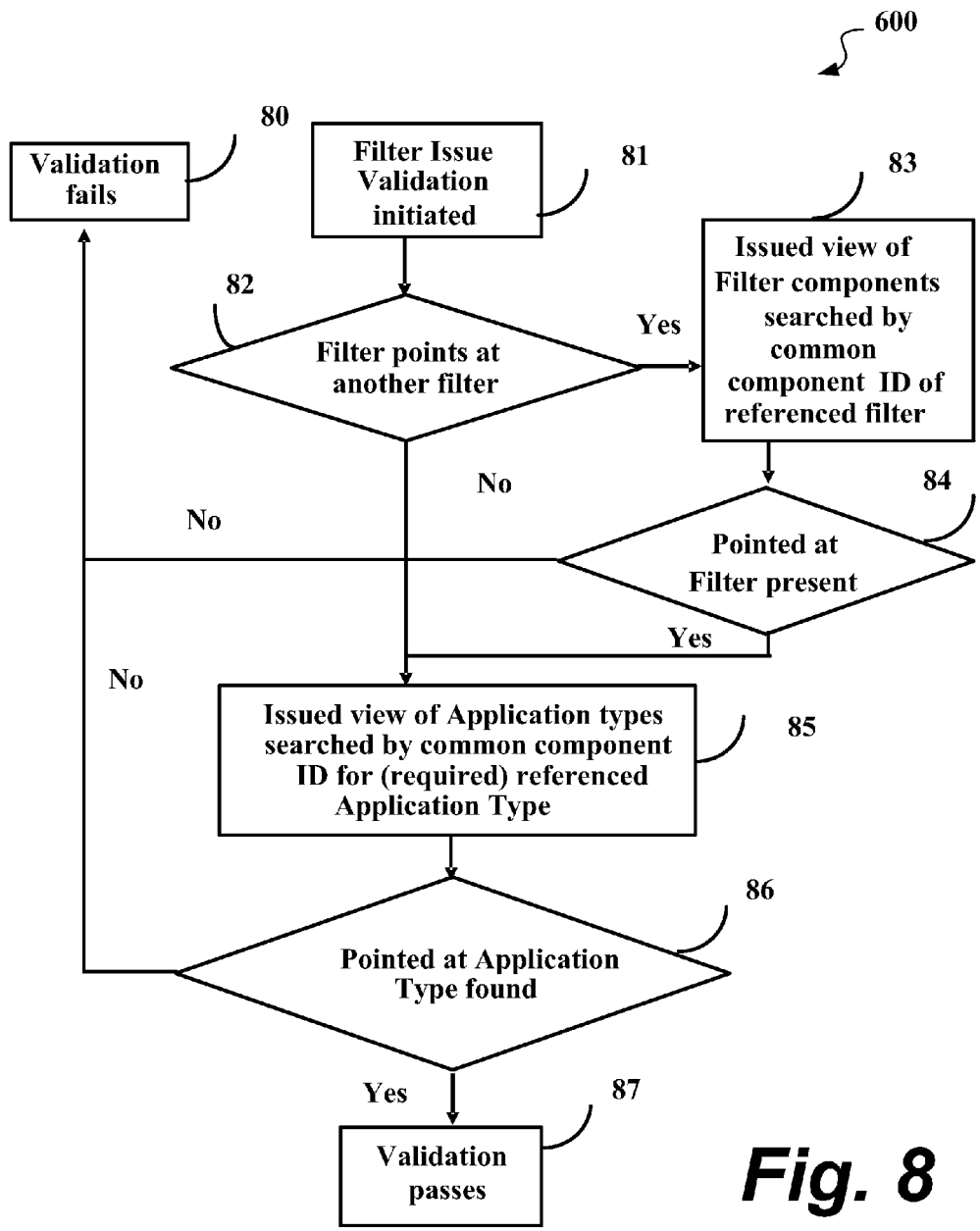
FIG. 8 shows a flowchart 600 illustrating a method for validating an issued version of Filter software component.

With reference to FIG. 8, a diagram 600 illustrates a method for validating an about to be issued version of the Filter software component. The validation process differs per type of software component. If validation does not pass the component does not become the issued version. At block 81, validation is initiated. At block 82, the method checks whether the version of Filter software component under examination points at another instance of Filter class. If such a pointer does not exist (exit "No" from block 82), the method proceeds to block 85, otherwise (exit "Yes" from block 82), the method continues with block 83. At block 83, the existence of the pointed instance of the Filter class is searched for in the Issued view of software components through common UIDs. At block 84, the method checks whether the instance of the Filter class, which has been pointer at, is present in the Issued view. If not (exit "No" from block 84), the validation fails (block 80); otherwise (exit "Yes" from block 84), the method continues with block 85. At block 85, the method checks the Issued View of Application Type software components for the existence of required versions of Application Type software components, which have been pointed at by the component UID of the Filter under examination. At block 86, the method checks whether such required versions of the Application Type software components exists. If not (exit "No" from block 86), the validation method fails (block 80), otherwise (exit "Yes" from block 86), the validation method passes (block 87).

Figure 9:
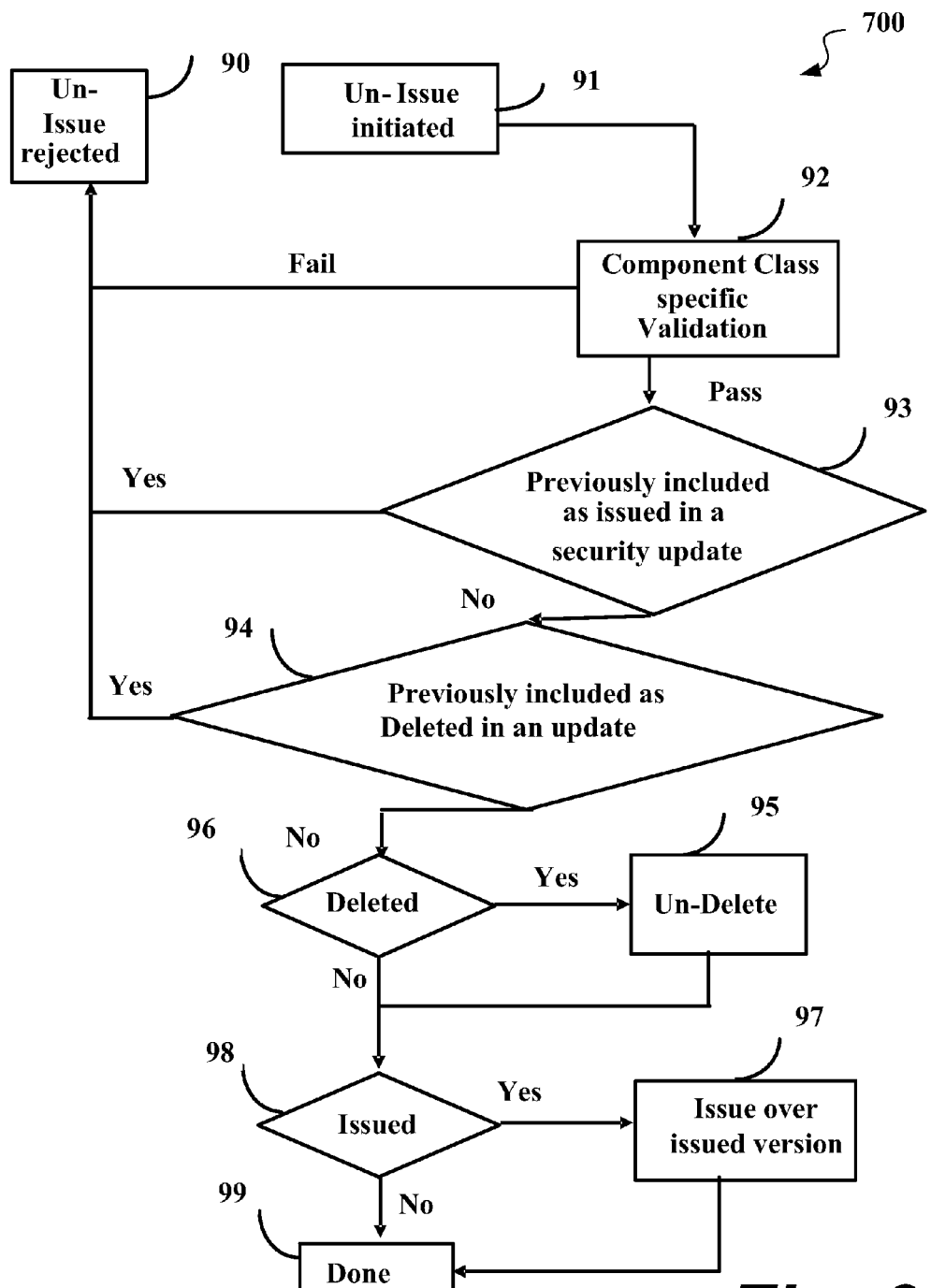
FIG. 9 shows a flowchart 700 illustrating a method for un-issuing a version of software component, comprising assigning an un-issued indicator.

With reference to FIG. 9, a diagram 700 illustrates a method for assigning an un-issued indicator to a version of software component. At block 91, the Un-Issue method is initiated. At block 92, the method checks rules for coupling between the version of software component under examination and instances of classes, including existing pointers for the Issued view of software components. If the rules are violated (exit "Fail" from block 92), the Un-Issue is rejected (block 90); otherwise (exit "Pass" from block 92), the method continues to block 93. At block 93, the method checks whether the version of software component was previously assigned an issued indicator in an update for a software release. If this is true (exit "Yes" from block 93), the un-issue is rejected (block 90), otherwise (exit "No" from block 93), the method continues to block 94. At block 94, the method checks whether the version of software component was previously marked as deleted in an update for a software release. If this is true (exit "Yes" from block 94), the Un-Issue is rejected (block 90), otherwise (exit "No" from block 94), the method continues to block 96, where the method checks whether the version of software component has a deleted indicator. If not (exit "No" from block 96), the method continues to block 98, otherwise (exit "Yes" from block 96), the method continues to block 95, where the deleted version of software component is un-deleted, and the method continues to block 98. At block 98, the method checks whether the version of software component under examination has an issued indicator. If not (exit "No" from block 98), the method is terminated (block 99), otherwise (exit "Yes" from block 98), the method continues with block 97. At block 97, the version of software component under examination is assigned an un-issued indicator, followed by the termination of the method at block 99.

Figure 10:
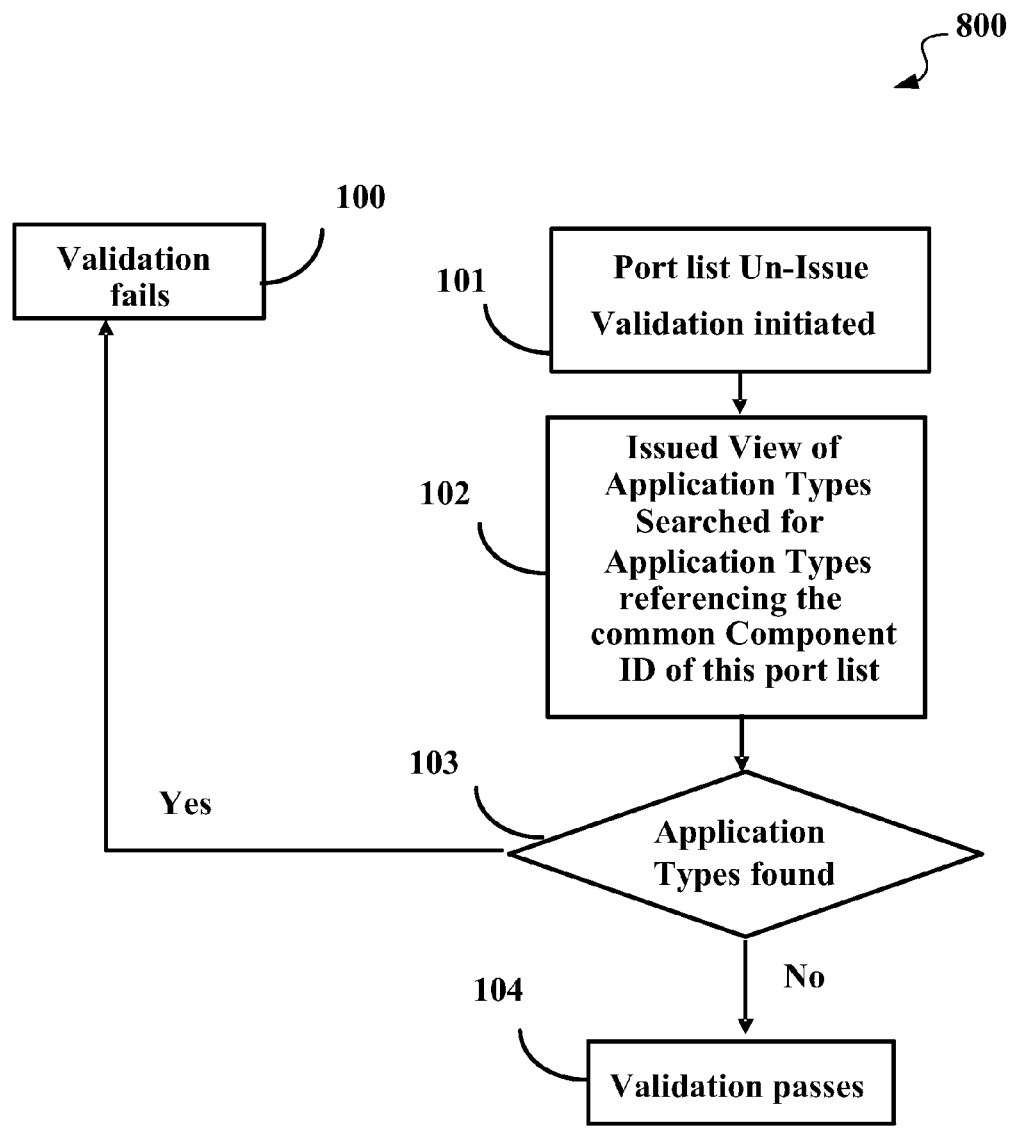
FIG. 10 shows a flowchart 800 illustrating a method for un-issue validation for a version of port list software component.

With reference to FIG. 10, a diagram 800 illustrates a method for un-issue validation for a version of Port List software component. At block 101, the Un-Issue validation method is initiated. At block 102, the method checks the Issued view of software components for instances of Application Type software components referencing the component UID under examination. At block 103, the method verifies if such versions of the Application Type software components were found. If yes (exit "Yes" from block 103), the Un-Issue validation fails (block 100), otherwise (exit "No" from block 103), the Un-Issue validation passes (block 104).

Figure 11:
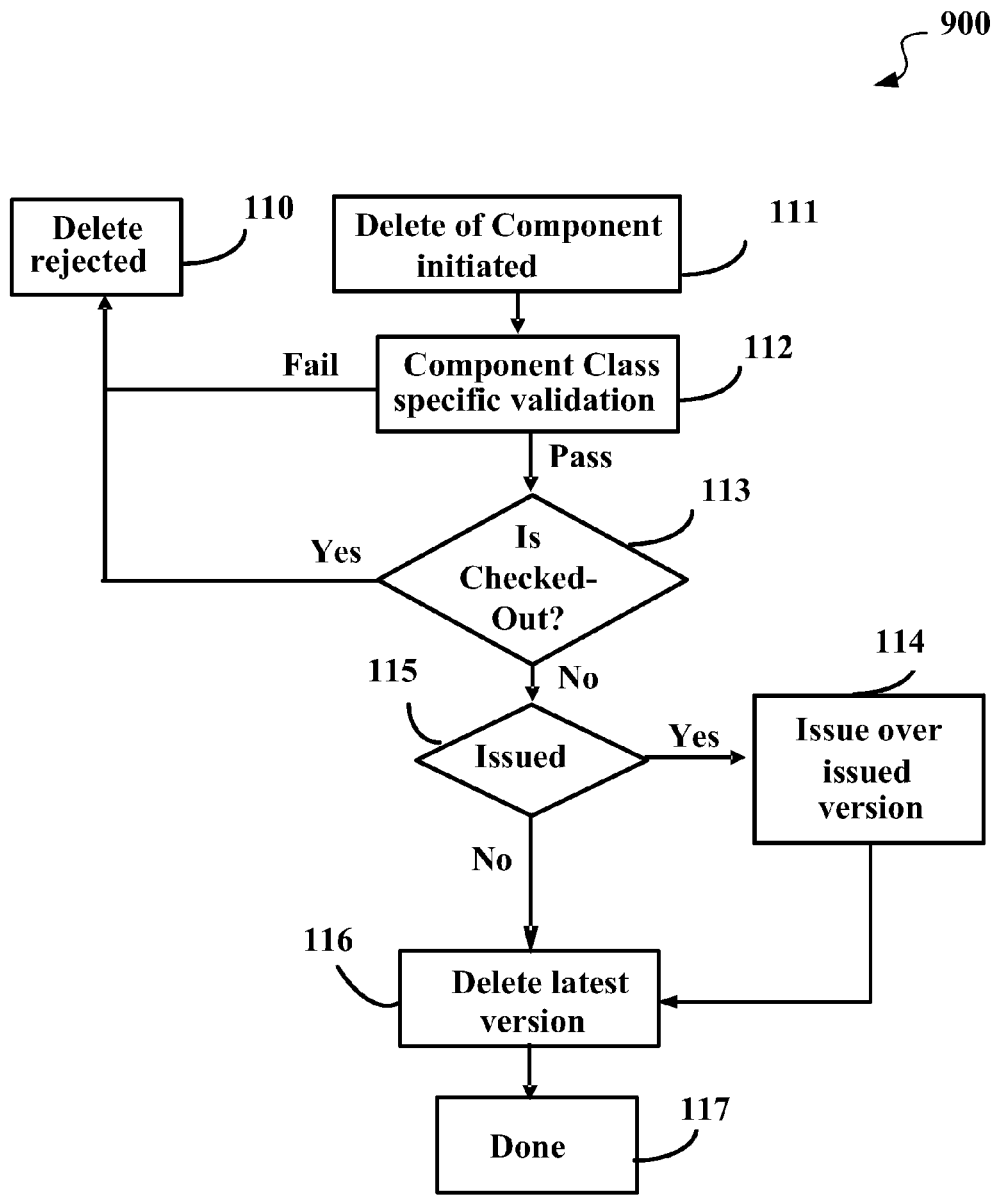
FIG. 11 shows a flowchart 900 illustrating a method for deleting a version of software component from the update of software release.

With reference to FIG. 11, a diagram 900 shows a flowchart 900 illustrating a method for deleting a version of software component from the update of software release. At block 111, the method starts. At block 112, the method checks for instances of software components in the Latest view and the Issued view, which point at the component UID under examination. If rules are violated (exit "Fail" from block 111), the method is rejected (block 110), otherwise (exit "Pass" from block 111), the method continues to block 113. At block 113, the method determines if the version of software component has been checked-out, i.e. withdrawn from the repository of software components for further development. If yes (exit "Yes" from block 113), the delete is rejected (block 110). If not (exit "No" from block 113), the method continues to block 115. At block 115, the method checks if the version of software component under examination is assigned an issued indicator. If yes (exit "Yes" from block 115), the method continues to block 114; otherwise (exit "No" from block 115), the method continues to block 116. At block 114, the previous version of software component having an issued indicator is assigned an un-issued indicator, and the version of software component under examination is assigned an issued indicator instead, after which the method proceeds to block 116. At block 116, the latest version of software component is assigned a deleted indicator, and its check-in retired date time stamp is set to the current date. At block 117, the method terminates.

Figure 12:
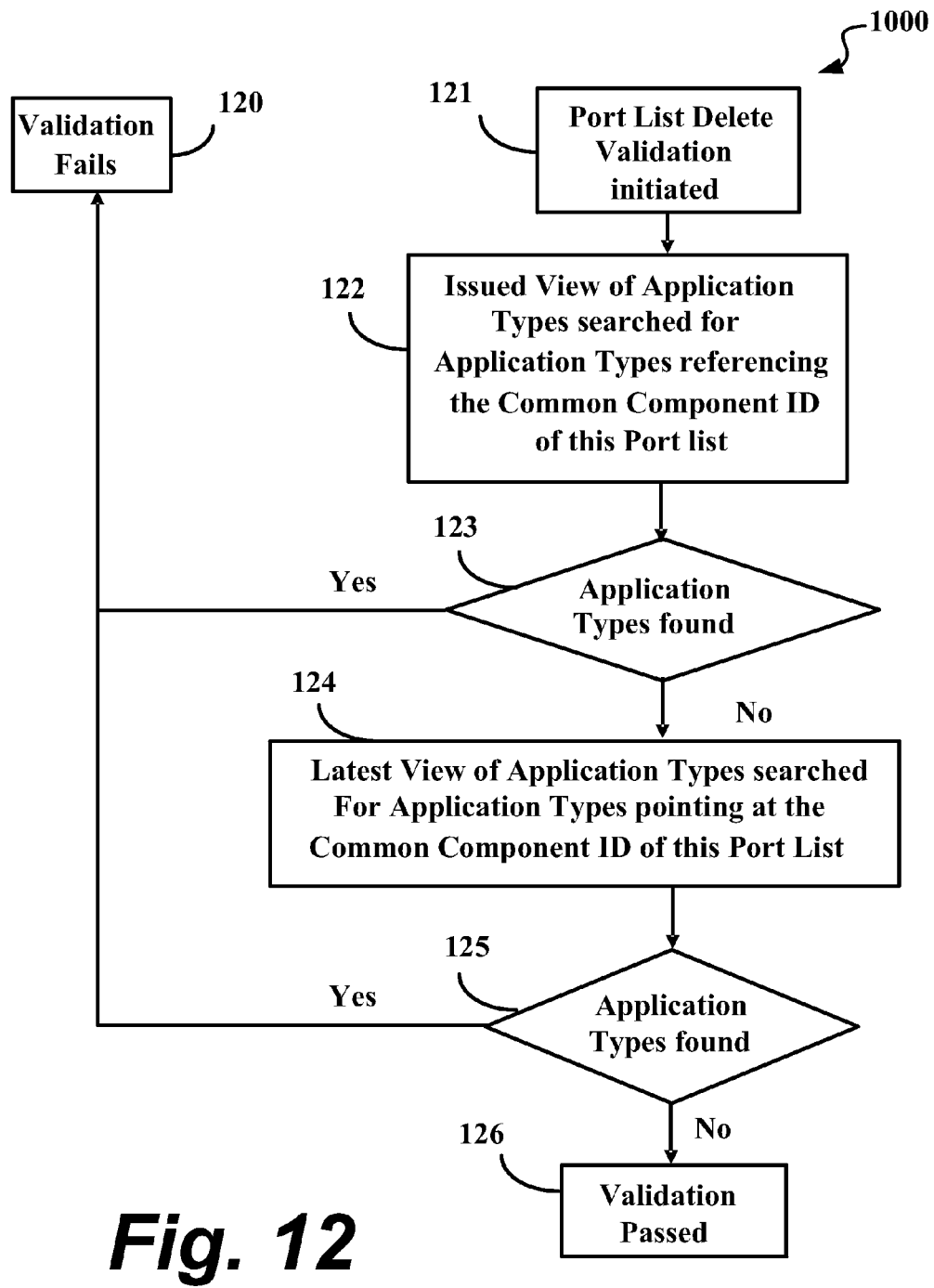
FIG. 12 shows a flow chart 1000 illustrating delete validation method for a version of a port list software component.

With reference to FIG. 12, a diagram 1000 illustrates a delete validation method for a version of Port List software component. At block 121, the method starts. At block 122, the method searches for instances of Application Type software components in the Issued view pointing at the component UID under examination. At block 123, the method verifies is such versions of Application Type software components are found. If yes (exit "Yes" from block 123), delete validation fails (block 120); otherwise (exit "No" from block 123), the method continues to block 124. At block 124, the method searches for instances of Application Type software components in the Latest view pointing at the component UID under examination. At block 125, the method verifies if such versions of Application Type software components are found. If yes (exit "Yes" from block 125), delete validation fails (block 120); otherwise (exit "No" from block 125), the delete validation method passes (block 126).

Figure 13:
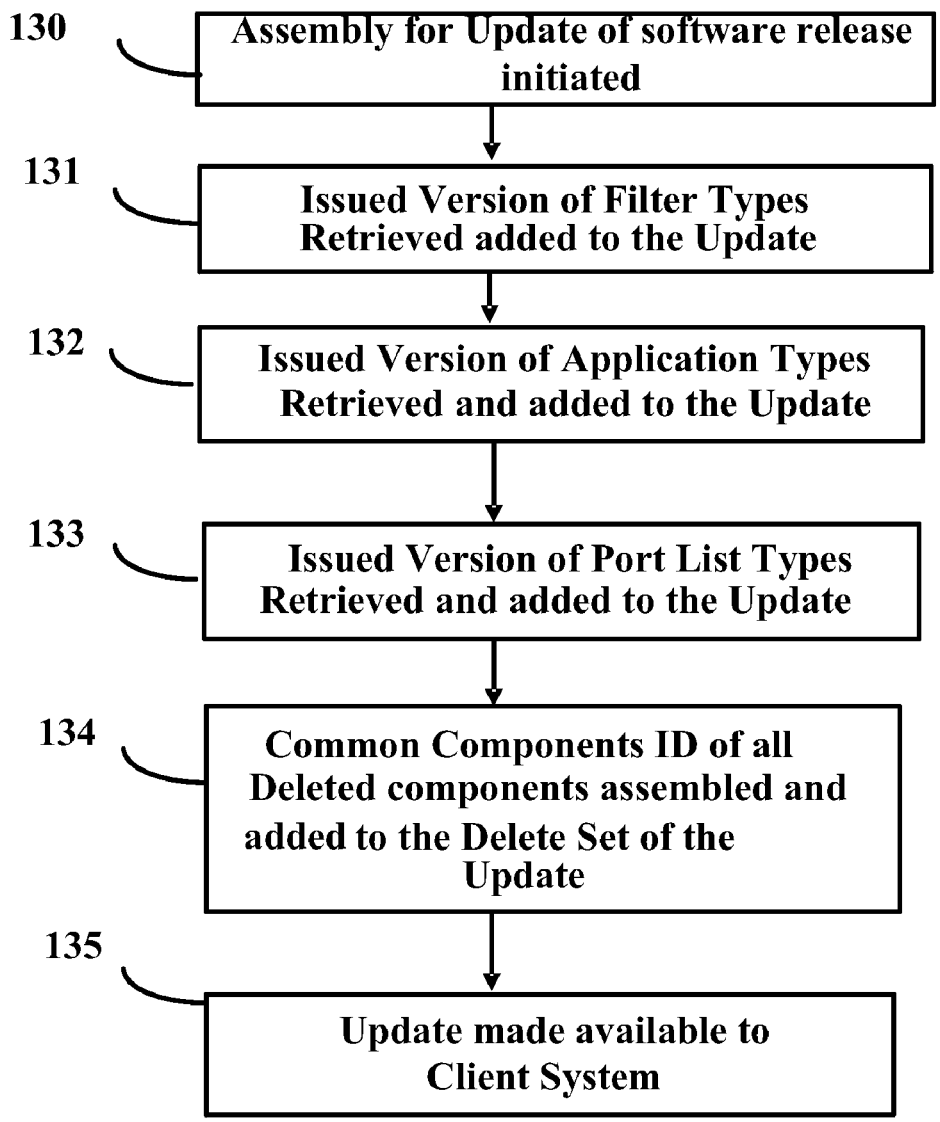
FIG. 13 shows a flowchart 1100 illustrating an assembly of an update for software release according to the embodiment of the present invention.

With reference to FIG. 13, a diagram 1100 illustrates an assembly of an update for software release according to the embodiment of the present invention. At block 130, the assembly of the update for software release is initiated. At block 131, versions of Filter software components having issued indicators are added to the update. At block 132, versions of Application Type software components having issued indicators are added to the update. At block 133, versions of Port List software components having issued indicators are added to the update. At block 134, common UIDs for all versions of software component having deleted indicators are added to the update, followed by compiling the update of software release and making it available to a client.

Figure 14:
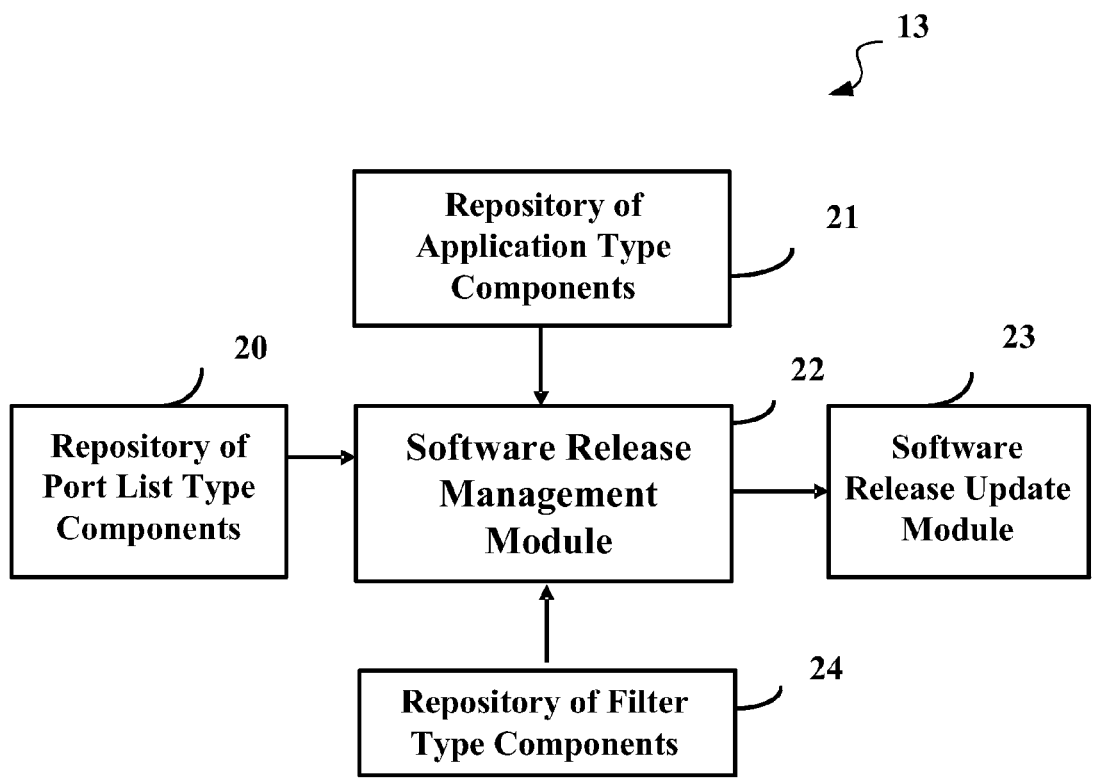
FIG. 14 shows the Release Management System 13 of FIG. 1 in more detail.

FIG. 14 illustrates the Release Management System 13 of FIG. 1 in more detail. The Release Management System 13 resides at the server computer 11, comprising a Central Processing Unit (CPU) and the memory, storing computer executable instructions, thus forming various modules of the Release Management System 13 as will be described in detail below. The computer readable instructions, when executed, perform the steps of the methods described above. The Release Management System 13 includes a Software Release Management Module 22, comprising software release management rules, along with a number of repositories of software components, for brevity to be referred to as components. Three types of repositories of software components are shown in FIG. 14, namely Repository of Port List components 20, Repository of Application Type components 21, and Repository of Filter components 24. The Release Management System 13 further comprises a Software Release Update Module 22 for assembling the update of software release.

The Software Release Management Module 22 selects software components from the Repositories 20, 21, 24 of Port List, Application Type and Filter components, which are supplied to the Software Release Update Module 23 for publishing the update of software release in accordance to the methods of the embodiment of the invention described above.

Figure 15:
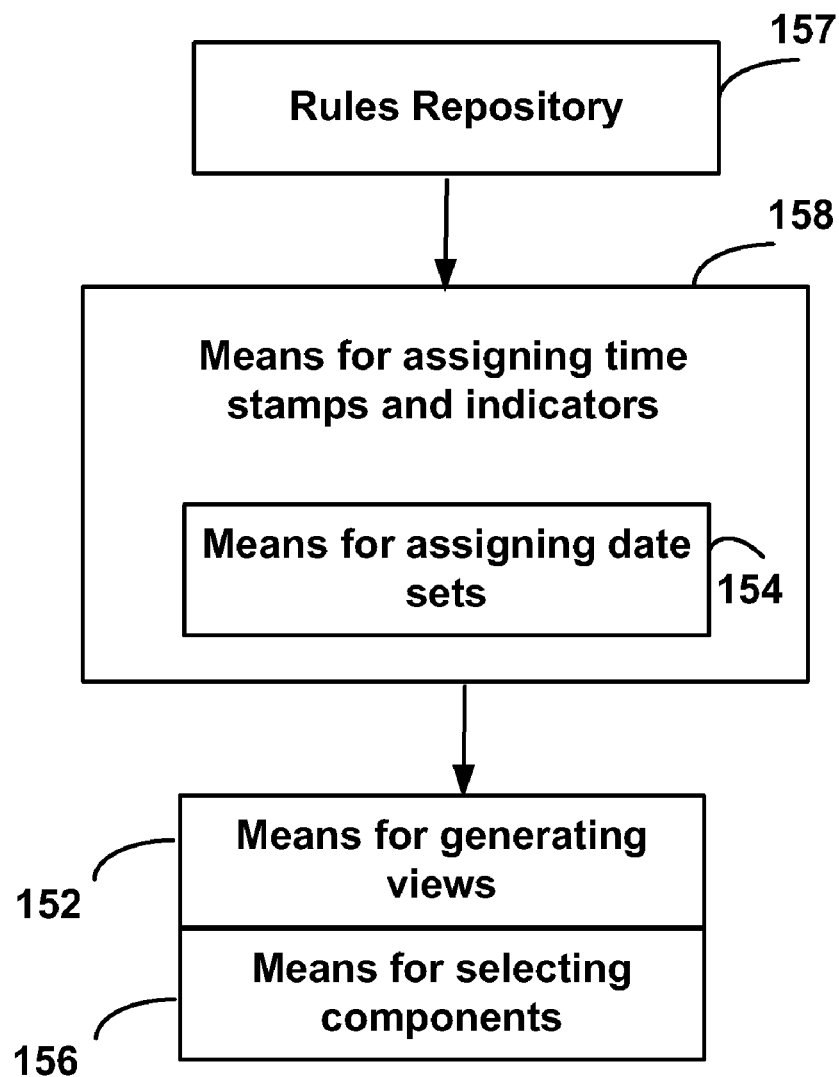
FIG. 15 shows the Software Release management Module of FIG. 14 in more detail.

FIG. 15 shows the Software Release Management Module 22 of FIG. 14 in more detail. It comprises Rules Repository 157, where versions of software components are checked for satisfying the rules as described above; means 158 for assigning time stamps and indicators to versions of software components, e.g., deleted, issued, and un-issued indicators, further comprising means 154 for assigning date sets, e.g., an issued date set and checked-in date set. Once the time stamps and indicators are assigned to versions of software components, their status in the update for software release is defined. The Software Release Management Module 22 further comprises means 152 for generating views of versions of software components, e.g., the Latest view and the Issued view; and means 156 for selecting versions of software components to be included in the update of software release.

It is understood that numerous modifications can be made to the methods and system described above. It is contemplated that various other classes of software components can be introduced, as required, apart from the Application Type, Port List and Filter classes described above. Various other designations of date sets, time stamps and indicators may be assigned to versions of software components to indicate their status in an update for software release. In the system for assembling an update for software release, the means for assigning date sets, and means for assigning indicators can be formed separate from the means for assigning time stamps as required. Repositories 20, 21 and 23 of versions of software components may be stored in one database on one computer, or alternatively on different computers communicating over a network. Alternatively, all repositories 20, 21 and 23 can be combined into one combined repository of versions of software components, which is in communication with the Software Release Management Module 22. Similarly, the Software Release Update Module, where the assembly of the update for software release takes place, may be combined with the Software Release Management Module as needed.

A computer readable medium such as floppy, CD-ROM, DVD or memory is also provided comprising computer readable instructions stored thereon, when executed by a processor, to perform the steps of the methods described above.

Although the embodiment of the invention has been described in detail, it will be apparent to one skilled in the art that variations and modifications to the embodiment may be made within the scope of the following claims.

What is claimed is:

1. A system for assembling an update for a software release, comprising:
    a processor and a memory having computer readable instructions stored thereon for execution by the processor, causing the processor to:
        define classes of software components, each class comprising a plurality of instances, each instance having a unique identifier (UID), said each instance of said each class representing a software component, which has a plurality of versions;
        for each version of the software component, assign one or more time stamps, and an indicator identifying a release status of the version of the software component;
        introduce a flexible coupling between versions of the software components and instances of classes, including introducing a pointer between a version of the software component and a UID of an instance of a class associated with the version;
        select versions of software components from which pointers originate;
        for each instance of the class, to which the pointer points at, select one version of the software component based on the assigned indicator, and
        assemble the selected versions of software components into the update of the software release.

2. The system as described in claim 1, wherein the computer readable instructions further cause the processor to assign the indicator, comprising one or more of the following indicators:
    a deleted indicator when a version of the software component is no longer needed;
    an issued indicator when a version of the software component is included in a current software release; or an un-issued indicator when a new version of the software component has been submitted to a repository of software components, or when the version of the software component does not have the issued or deleted indicator.

3. The system as described in claim 2, wherein the computer readable instructions further cause the processor to assign a checked-in date set and an issued date set to each version of the software components.

4. The system as described in claim 3, wherein the computer readable instructions further cause the processor to assign the checked-in date set, including a checked-in date time stamp when the version of the software component has become the latest version of the software component, and a checked-in retired date time stamp when a new version of the software component is submitted to the repository of software components.

5. The system as described in claim 3, wherein the computer readable instructions further cause the processor to assign the issued date set including an issued date time stamp when the version of the software component is assigned the issued indicator, and an issued retired date time stamp when the version of the software component is assigned the un-issued or deleted indicator.

6. The system as described in claim 2, wherein the computer readable instructions further cause the processor to select versions of software components, which have the issued indicator to form an issued view of the software components.

7. The system as described in claim 4, wherein the computer readable instructions further cause the processor to select versions of software components having the most recent checked-in date time stamps and no checked-in retired date time stamps to form a latest view of the software components.

8. The system as described in claim 2, wherein the computer readable instructions further cause the processor to define one or more of the following classes: (i) an Application Type class representing software applications to be protected; (ii) a Filter class representing software filters to provide protection against computer intrusion attacks; (iii) a Port List class representing computer ports.

9. The system as described in claim 4, wherein the computer readable instructions further cause the processor to prevent, before the selected versions of software components are assembled into the update of the software release, the version of the software component, from which the pointer originates, to be set as the issued version of the software component unless at least one version of a software component in the instance of the class, to which the pointer points at, has the issued indicator.

10. The system as described in claim 4, wherein the computer readable instructions further cause the processor to prevent, before the selected versions of software components are assembled into the update of the software release, the version of the software component, to which the pointer points, to have a deleted indicator applied as long as the version of the software component is pointed to by a pointer originating from a version of another software component, which has an issued indicator.

11. The system as described in claim 2, wherein the computer readable instructions further cause the processor to prevent the version of the software component to have the un-issued indicator once the version of the software component is included in the update of the software release.

12. The system as described in claim 8, wherein the computer readable instructions further cause the processor to provide a pointer between the version of the software component in the Filter class and the UID of the instance of the Application Type class.

13. The system as described in claim 2, wherein the computer readable instructions further cause the processor to
determine whether the version of the software component does not have the deleted indicator;
determine whether the version of the software component does not have the deleted indicator;
if there is no a previous version of the software component, assign a checked-in date time stamp, indicating when the version of the software component has become the latest version of the software component, to the version of the software component;
if there is a previous version of the software component, set a checked-in retired date time stamp, indicating when a new version of the software component is submitted to the repository of software components, to the previous version of the software component;
otherwise, terminate execution of the computer readable instructions.

14. The system as described in claim 13, wherein the computer readable instructions further cause the processor to check-in a version of a Filter software component from which the pointer originates, the Filter software component representing a software filter to provide protection against computer intrusion attacks, comprising:
ensuring that an Application Type software component, to which the pointer points at, exists;
the Application Type software component representing a software application to be protected; and
provided there is a pointer to another Filter software component, ensuring that said another Filter software component exists.

15. The system as described in claim 2, wherein the computer readable instructions further cause the processor to assign the issued indicator to the version of the software component, comprising:
if the version of the software component has the deleted indicator, assigning the un-issued indicator to the version of the software component;
if the version of the software component does not have the deleted indicator, determining that the version of the software component does not have any version with the issued indicator, followed by assigning the issued indicator to the version of the software component and setting an issued retired date time stamp, indicating when the version of the software component is assigned the un-issued indicator, to a previous version of the software component.

16. The system as described in claim 15, wherein the computer readable instructions further cause the processor to:
assign the issued indicator to the version of the Filter software component from which the pointer originates, comprising:
ensuring that an Application Type software component, to which the pointer points at, exists and has an issued indicator, the Application Type software component representing a software application to be protected; and
provided there is a pointer to another Filter software component, ensuring that said another Filter software component exists and has an issued indicator, the Filter
software component representing a software filter to provide protection against computer intrusion attacks; otherwise terminating the assigning of the issued indicator.

17. The system as described in claim 2, wherein the computer readable instructions further cause the processor to un-issue the version of the software component, comprising assigning the un-issued indicator, comprising:
- determining whether the version of the software component was not previously included in the update of the software release and then deleted from the update;
- if the version of the software component has the deleted indicator, assigning the un-issued indicator to the version of the software component;
- if the version of the software component does not have the deleted indicator, assigning the issued indicator to the version of the software component, and assigning an issued retired date time stamp, indicating when the version of the software component is assigned the un-issued indicator, to the previous version of the software component;
- otherwise, terminating the assigning the un-issued indicator.

18. The system as described in claim 17, wherein the computer readable instructions further cause the processor to un-issue a version of a Port List software component specifying a computer port, including assigning the un-issued indicator, comprising:
- searching for versions of Application Type software components in a latest view or an issued view, which point to the version of the Port List component, the issued view comprising versions of software components having the issued indicator, and the latest view comprising versions of software components having the most recent checked-in date time stamps when the versions of the software components have become the latest versions of the software components, and having no checked-in retired date time stamps when new versions of the software components are submitted to the repository of the software components;
- the Application Type software component representing a software application to be protected; and
- terminating the un-issuing the version of the Port List software component if the Applicant Type software components, which point to the Port List software component, have issued indicators.

19. The system as described in claim 2, wherein the computer readable instructions further cause the processor to assign the deleted indicator to the version of the software component, comprising:
- provided the version of the software component has not been withdrawn from the repository of software components for further development:
- if the version of the software component has the issued indicator, assigning the un-issued indicator and an issued retired date time stamp, indicating when the version of the software component is assigned the un-issued indicator, to the previous version of the software component;
- if the version of the software component does not have the issued indicator, assigning the deleted indicator to the version of the software component and setting a checked-in retired date time stamp, indicating when a new version of the software component is submitted to the repository of software components, to the current date.

20. The system as described in claim 19, wherein the computer readable instructions further cause the processor to perform the validation, comprising:
- assigning the deleted indicator to the version of a Port List software component of an instance of a Port List class, the Port List Class representing computer ports, comprising ensuring that no version of the Application Type software component in the latest view or an issued view points at the instance of the Port List class, the issued view comprising software components which have the issued indicator, and the Application Type software component representing a software application to be protected.

* * * * *

UNITED STATES PATENT AND TRADEMARK OFFICE
CERTIFICATE OF CORRECTION

PATENT NO.        : 8,219,985 B2                          Page 1 of 1
APPLICATION NO.   : 13/324210
DATED             : July 10, 2012
INVENTOR(S)       : Jeb Stuart Thorley et al.

It is certified that error appears in the above-identified patent and that said Letters Patent is hereby corrected as shown below:

Column 18, line 5, "to" should read --to:--.

Column 18, line 64, cancel the text beginning with "Filter" to and ending "the issued indicator." in line 67, and insert the following text:
    --Filter software component representing a software filter to provide protection against computer intrusion attacks; otherwise terminating the assigning of the issued indicator.--

Signed and Sealed this
Twenty-eighth Day of August, 2012

David J. Kappos
*Director of the United States Patent and Trademark Office*